Patented July 14, 1953

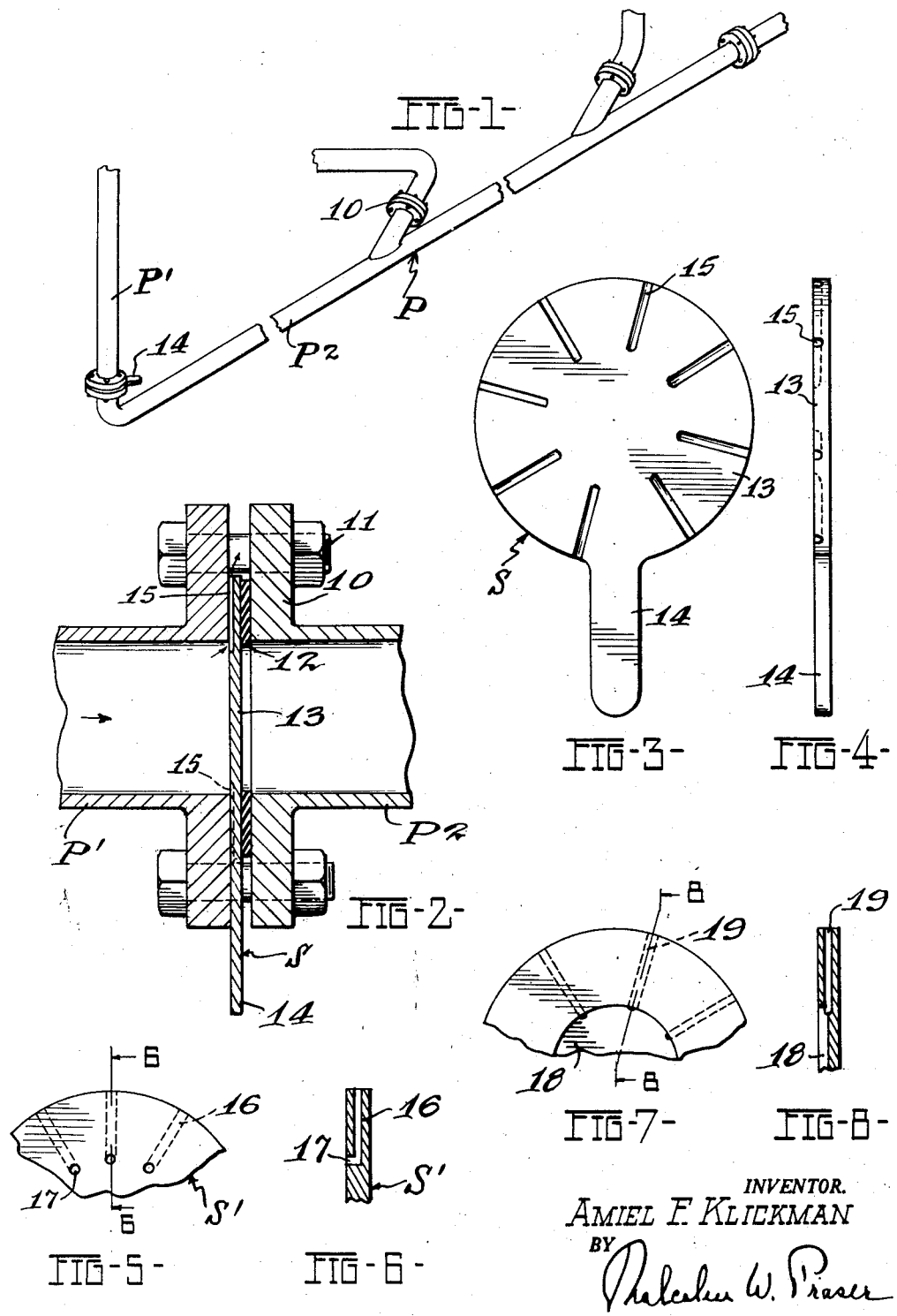

2,645,244

UNITED STATES PATENT OFFICE 2,645,244

CLOSE-OFF DEVICE FOR PIPE LINES

Amiel F. Klickman, Toledo, Ohio

Application August 6, 1948, Serial No. 42,772

1 Claim. (Cl. 137—561)

This invention relates to a shut-off device for use in connection with the cleaning of pipe lines where it is desired to seal off one section of a pipe line from another.

In installations embodying a labyrinth of pipe lines, such, for example, in oil refineries, it is necessary not infrequently to clean one portion of a pipe line without disturbing the contiguous portion. Some means is ordinarily provided to seal off the one section and then the contiguous pipe line section is cleaned by forcing the fluids therefrom and then introducing liquid or other fluids under pressure to force impurities therefrom. It is a desideratum to provide a simple device which can be readily and conveniently interposed between these pipe line sections and which, of itself, will produce an effective fluid seal for one section but enable the contiguous section to be expeditiously cleansed of impurities.

An object is to produce a new and improved sealing device of the above character which can be conveniently installed by first loosening the flanged unions between contiguous sections, then inserting the device and thereafter resecuring the flanged fittings, provision being made for venting the pipe section to be cleaned to enable the contents thereof to be forced therefrom, the device thereupon being readily removed to restore the connection between such contiguous sections.

For purposes of illustration but not of limitation, embodiments of the invention are shown in the accompanying drawings, in which:

Figure 1 is a perspective view of a portion of a pipe line, one section of which is desired to be cleaned, a sealing disc being clamped in position of use;

Figure 2 is an enlarged fragmentary longitudinal sectional view showing the sealing disc installed in the position of use, sealing off one pipe section and venting the other section to the outside;

Figure 3 is a plan view of the sealing disc showing the side thereof formed with venting channels;

Figure 4 is an edge elevation of the disc shown on Figure 3;

Figure 5 is a fragmentary plan view of an alternate form of disc in which the radial channels are formed by passages drilled through the body of the disc;

Figure 6 is a sectional view substantially on the line 6—6 of Figure 5;

Figure 7 is a fragmentary plan view of a still further form of sealing disc in which the one side of the central portion is cored out, radial passages opening into the cored-out area; and Figure 8 is a sectional view substantially on the line 8—8 of Figure 7.

The illustrated embodiment of the invention comprises a pipe line P which is made up of a number of sections, each section terminating in an outwardly extending flange 10 which is secured ot a similar flange on the adjacent section by a plurality of bolt and nut assemblies 11, a sealing washer 12 being ordinarily disposed between the adjacent flanges for effecting a fluid-tight seal. Assuming that it is desired to clean out the section $P^1$ without disturbing the section $P^2$ or any of its branches, then in that event, the bolt and nut assemblies 11 connecting the pipe sections $P^1$ and $P^2$ are removed and the flanges separated sufficiently to permit the introduction of a sealing device S which is in the form of a flat round disc 13 having an elongate handle extension 14. The handle extension 14 is of sufficient length to project outwardly from between the flange members 10 to serve as a signal or reminder that the device S is in place. The disc 13 and its handle may be of any suitable material, but preferably sheet metal such as boiler plate has been found quite satisfactory.

One side of the disc body 13 is substantially flat and imperforate. The opposite side of the body is formed with a series of radially extending grooves or channels 15 which terminate at the peripheral edge of the disc and extend inwardly a sufficient distance so that the inner end portion of the grooves are open to the inside of the pipe section, the pipe section $P^1$ in this instance, that being the pipe section which it is desired to clean out. The depth and width of the grooves 15 will vary in accordance with the character of the fluids and impurities within the pipe line. In many installations of this character, the flanges 10 are equipped with eight bolt-receiving holes and the sealing device S on Figure 3 is designed for such flanged structures, there being eight venting channels 15 arranged so as not to interfere with the connecting bolt assemblies. It will further be observed that the diameter of the disc body 13 is such as to lie inside of the bolt assemblies 11 and these assemblies retain the disc positively in the proper position of use. Thus the imperforate or relatively smooth side of the disc body 13 abuts flatly against the sealing washer 12, which is in the form of a flat annulus, and, when the bolt assemblies 11 are tightened, the pipe section $P^2$ is effectively sealed to prevent the loss of the contents thereof. As soon as the cleaning operation has been completed, the cleaned pipe line can then be safely worked on, such, for example, as a welding operation, and, because of the flat sealing contact achieved between the channeled side of the disc, no leakage of fluid from the line P² can take place. The flat areas on the channeled side of the disc are sufficient to enable it to be drawn tightly against the adjacent flange. Thereafter the bolt assemblies 11 are again removed or loosened to enable the sealing device S to be removed and are then tightened.

In the form of the invention shown in Figures 5 and 6, the disc S' has a hole 16 drilled from the peripheral edge and between the faces of the disc, the same joining a drilled hole 17 which extends from one face. The number and arrangement of these holes is similar to that above described.

It will also be understood that in the form of the invention shown in Figures 7 and 8, the central portion of the disc is cored out as indicated at 18 and a series of radially extending drilled passages 19 connect the cored-out portion 18 with the outer periphery.

From the above description, it will be manifest that I have produced an exceedingly simple and inexpensive pipe sealing device which can be readily and conveniently applied in position of use and efficiently accomplishes the desired purpose. The work of cleaning out pipe lines is greatly simplified and expedited at a minimum expense, and danger of liquids or gases leaking from the sealed off portion is for all practical purposes eliminated.

It is to be understood that numerous changes in details of construction, arrangement and operation may be effected without departing from the spirit of the invention especially as defined in the appended claim.

What I claim is:

A line blind for sealing off one normally open end of one member of a jointed pipe line while venting the adjacent normally open end of the adjacent pipe member, wherein the adjacent ends of said members are connected to one another by radially outward flanges having a circular series of uniformly spaced bolt holes with bolt assemblies extending therethrough to connect said flanges in abutting relationship, comprising a transversely imperforate, disk-shaped plate larger than the openings at the ends of said pipe members and having opposite, substantially flat surfaces sealably engageably between the flanges at one of the joints of said pipe line, said disk being of lesser diameter than the diameter of the bolt circle and being unbroken on one side whereby completely to seal off the otherwise open end of one pipe member, the opposite side of said plate having a flat and solid central portion of less diameter than the interior of the adjacent pipe member and a plurality of angularly spaced radial channels in the face thereof emanating from the outer regions of said central portion and extending to the periphery of said plate, whereby to vent the interior of the other pipe member, said channels being substantially uniformly spaced at angular intervals throughout the entire circumference of said plate, whereby, when said plate is clamped tightly between said pipe members, one of said pipe members is vented to the atmosphere while the other of said pipe members is sealed off and a tell-tale handle tab projecting radially outward from the periphery of said plate, said tab being narrower than the spacing between said bolt-holes and of substantially greater radial length than the radial dimension of pipe flanges whereby to project outwardly therefrom when the disk is installed between said flanges.

AMIEL F. KLICKMAN.

References Cited in the file of this patent

UNITED STATES PATENTS

| Number | Name | Date |
|---|---|---|
| 577,924 | Libbey | Mar. 2, 1897 |
| 1,212,886 | Benson | Jan. 16, 1917 |
| 1,274,103 | Story | July 30, 1918 |
| 1,568,976 | Jones | Jan. 12, 1926 |
| 2,354,778 | Simpson | Aug. 1, 1944 |
| 2,386,893 | Hamer | Apr. 21, 1945 |

FOREIGN PATENTS

| Number | Country | Date |
|---|---|---|
| 22,183 | Great Britain | of 1910 |
| 40,065 | Sweden | of 1913 |